United States Patent
Kuroyanagi et al.

(10) Patent No.: US 9,944,258 B2
(45) Date of Patent: Apr. 17, 2018

(54) DEVICE FOR OPERATING VEHICULAR PARKING BRAKE

(71) Applicants: Kenji Kuroyanagi, Toyota (JP); Narito Tani, Toyota (JP)

(72) Inventors: Kenji Kuroyanagi, Toyota (JP); Narito Tani, Toyota (JP)

(73) Assignee: TOYODA IRON WORKS CO., LTD., Toyota (JP)

( * ) Notice: Subject to any disclaimer, the term of this patent is extended or adjusted under 35 U.S.C. 154(b) by 0 days.

(21) Appl. No.: 14/889,918

(22) PCT Filed: May 21, 2013

(86) PCT No.: PCT/JP2013/064127
§ 371 (c)(1),
(2) Date: Nov. 9, 2015

(87) PCT Pub. No.: WO2014/188519
PCT Pub. Date: Nov. 27, 2014

(65) Prior Publication Data
US 2016/0075312 A1    Mar. 17, 2016

(51) Int. Cl.
*G05G 1/30* (2008.04)
*B60T 7/06* (2006.01)
*G05G 1/44* (2008.04)

(52) U.S. Cl.
CPC . *B60T 7/06* (2013.01); *G05G 1/44* (2013.01)

(58) Field of Classification Search
CPC ................... B60T 7/045; B60T 7/06
See application file for complete search history.

(56) References Cited

U.S. PATENT DOCUMENTS 2,975,654 A * 3/1961 Vigmostad .............. B60T 7/047
74/516
3,929,033 A * 12/1975 Marx ........................ B60T 7/02
173/100
(Continued)

FOREIGN PATENT DOCUMENTS

CN      1144114 C      3/2004
JP      H09-30383 A    2/1997
(Continued)

OTHER PUBLICATIONS

Jan. 25, 2017 Office Action issued in Chinese Patent Application No. 201380076752.X.
(Continued)

*Primary Examiner* — Vicky A Johnson
(74) *Attorney, Agent, or Firm* — Oliff PLC

(57) ABSTRACT

An operation device for a vehicle parking brake, which includes: support bracket fixed to vehicle body and having a pair of first and second side plates, which face each other with predetermined interval therebetween; operation pedal supported between first and second side plates of support bracket so as to be pivotable about a pivot axis; and return spring having one end portion hooked on operation pedal and other end portion hooked on first side plate and winding portion located between ends portions and wound about pivot axis and that biases operation pedal toward original position, and which operation pedal is operated to pivot about pivot axis, so a parking brake cable is subjected to tensile force, thereby operating parking brake, one of end portions of return spring being bent and formed so as to bias a pedal pad of operation pedal toward first or second side plate.

11 Claims, 10 Drawing Sheets

(56) References Cited

U.S. PATENT DOCUMENTS

| | | | | |
|---|---|---|---|---|
| 5,230,410 | A | * | 7/1993 | Yamamuro ............... B60T 7/06 192/223.4 |
| 5,275,262 | A | * | 1/1994 | Ojima ....................... B60T 7/06 188/265 |
| 5,385,068 | A | * | 1/1995 | White ....................... G05G 1/30 74/512 |
| 5,416,295 | A | * | 5/1995 | White ....................... G05G 1/38 200/61.89 |
| 5,775,174 | A | | 7/1998 | Kanbe et al. |
| 6,142,036 | A | * | 11/2000 | Mizuma .................. B60T 7/065 180/274 |
| 6,240,801 | B1 | | 6/2001 | Kojima et al. |
| 6,591,712 | B2 | * | 7/2003 | Goto ......................... B60T 7/06 74/514 |
| 7,337,692 | B2 | * | 3/2008 | Willemsen ............... G05G 1/38 74/512 |
| 9,278,671 | B2 | * | 3/2016 | Nagata ..................... B60T 7/045 |
| 2001/0011487 | A1 | | 8/2001 | Kojima et al. |
| 2001/0022113 | A1 | | 9/2001 | Kojima et al. |
| 2002/0157495 | A1 | | 10/2002 | Goto et al. |
| 2007/0227288 | A1 | * | 10/2007 | Ferenc .................... B60T 7/045 74/512 |

FOREIGN PATENT DOCUMENTS

| | | |
|---|---|---|
| JP | H10-287217 A | 10/1998 |
| JP | H11-34825 A | 2/1999 |
| JP | H11-338569 A | 12/1999 |
| JP | 2010-274856 A | 12/2010 |
| KR | 1998-054483 U | 10/1998 |
| KR | 2002-0009565 A | 2/2002 |
| KR | 10-0893430 B1 | 4/2009 |

OTHER PUBLICATIONS

Sep. 30, 2016 Office Action issued in Korean Patent Application No. 2015-7033057.

Sep. 22, 2017 Office Action issued in Chinese Patent Application No. 201380076752.X.

* cited by examiner

DEVICE FOR OPERATING VEHICULAR PARKING BRAKE

TECHNICAL FIELD

The present invention relates to operation devices for vehicle parking brakes, and more particularly to a technique of suppressing backlash in the lateral direction of an operation pedal without increasing the number of parts, assembly time, and the weight of the device.

BACKGROUND ART

One type of operation device for a vehicle parking brake includes: a support bracket fixed to a vehicle body and having a pair of first and second side plates, the first and second side plates facing each other with a predetermined interval therebetween; an operation pedal supported between the first and second side plates of the support bracket so as to be pivotable about a pivot axis; and a return spring that has one end portion hooked on the operation pedal and the other end portion hooked on the first side plate and a portion located between the end portions and wound about the pivot axis and that biases the operation pedal toward its original position. In this operation device, the operation pedal is operated to pivot about the pivot axis, so that a parking brake cable is subjected to a tensile force, thereby operating the parking brake. Examples of such an operation device are described in Patent Documents 1, 2, and 3. According to such an operation device for the vehicle parking brake, the operation pedal is depressed with a foot to switch the parking brake to a braking state. Therefore, operation of the operation device is easier and the braking force is more reliably obtained as compared to the case where the operation device is operated with a hand.

RELATED ART DOCUMENTS

Patent Documents

Patent Document 1: Japanese Patent Application Publication No. H11-034825
Patent Document 2: Japanese Patent Application Publication No. H09-030383
Patent Document 3: Japanese Patent Application Publication No. 2010-274856

SUMMARY OF THE INVENTION

Problem to be Solved by the Invention

In the above conventional operation devices for the vehicle parking brake, any backlash in the lateral direction of the operation pedal that is depressed with a foot may give an operator an uncomfortable feeling. It is therefore desired to minimize the backlash in the lateral direction of the operation pedal so as not to impair the operation feeling the operator has when operating the parking brake of the vehicle.

However, the operation devices described in Patent Documents 1, 2 and 3 do not have a mechanism that suppresses backlash in the lateral direction of the operation pedal, and these operation devices therefore do not satisfy the required values of the operation performance of the operation pedal. One solution to this is to provide a mechanism that suppresses backlash in the lateral direction of the operation pedal. In this case, however, the operation device needs to be a relatively large device requiring a large number of parts. This is disadvantageous as it increases assembly time, vehicle weight, and cost and reduces space on the front floor.

The present invention was developed in view of the above circumstances, and it is an object of the present invention to provide an operation device for a vehicle parking brake which has a simple configuration with no backlash in the lateral direction of an operation pedal.

Means for Solving the Problem

In order to achieve the above object, the inventors intensively studied and found the following facts. The return spring is wound into a coil shape about the pivot axis of the operation pedal, and has one end portion hooked on the operation pedal and the other end portion hooked on the first side plate, thereby biasing the operation pedal toward its original position. Accordingly, the return spring is disposed in a tilted manner so that the entire return spring is twisted, and a part of the operation pedal on which the one end portion of the return spring is hooked is subjected to a force toward the first side plate, whereby a stepping surface of the operation pedal, namely a surface to be stepped on, is subjected to moment in such a direction that the stepping surface of the operation pedal is moved to face toward the first side plate. Moreover, bending and forming the one end portion on the operation pedal side of the return spring so as to bias the operation pedal toward the return spring suitably eliminates backlash in the pivot axis direction, namely the lateral (right-left) direction, of the operation pedal. The present invention is based on the above knowledge.

That is, the principle of the present invention provides an operation device for a vehicle parking brake, which includes: (a) a support bracket fixed to a vehicle body and having a pair of first and second side plates, the first and second side plates facing each other with a predetermined interval therebetween; an operation pedal supported between the first and second side plates of the support bracket so as to be pivotable about a pivot axis; and a return spring that has one end portion hooked on the operation pedal and the other end portion hooked on the first side plate and a winding portion located between the end portions and wound about the pivot axis and that biases the operation pedal toward its original position, and in which the operation pedal is operated to pivot about the pivot axis, so that a parking brake cable is subjected to a tensile force, thereby operating the parking brake, characterized in that (b) one of the end portions of the return spring is bent and formed so as to bias a pedal pad of the operation pedal toward the first side plate or the second side plate.

Effects of the Invention

In the operation device for a vehicle parking brake as described above, the return spring is wound about the pivot axis into a coil shape, and the one end portion of the return spring adjacent to the operation pedal is bent and formed so as to bias the pedal pad of the operation pedal toward the first side plate or the second side plate when attached. The return spring wound into a coil shape is therefore disposed in a tilted manner so that the entire return spring is twisted, and the pedal pad of the operation pedal is subjected to the moment in such a direction that the stepping surface of the pedal pad faces toward the first side plate or the second side plate. Accordingly, backlash in the lateral direction of the operation pedal is suitably suppressed by the moment with such a simple configuration that the one end portion of the return spring adjacent to the operation pedal is bent and formed so as to bias the operation pedal toward the first side plate or the second side plate.

In one preferred form of the invention, (c) the one end portion of the return spring adjacent to the operation pedal projects from the winding portion in a direction tangential thereto and is bent at a predetermined angle toward the first side plate. The return spring wound into a coil shape is therefore disposed in a tilted manner so that the entire return spring is twisted, and the operation pedal is subjected to the moment in such a direction that the stepping surface of the pedal pad faces toward the first side plate. Accordingly, backlash in the lateral direction of the operation pedal is suitably suppressed.

In another preferred form of the invention, (d) a base end portion of the operation pedal has such a thickness dimension in a direction of the pivot axis that the base end portion of the operation pedal overlaps the winding portion in a radial direction of the winding portion, and has a hook hole through which the one end portion of the return spring adjacent to the operation pedal is hooked, the hook hole being located closer to the second side plate than a center plane located in a middle in a thickness direction of the base end portion is, and (e) the one end portion of the return spring adjacent to the operation pedal is formed so as to be bent toward the center plane side of the operation pedal. The return spring wound into a coil shape is therefore disposed in a tilted manner so that the entire return spring is twisted, and the operation pedal is subjected to the moment in such a direction that the stepping surface of the pedal pad faces toward the first side plate. Accordingly, backlash in the lateral direction of the operation pedal is suitably suppressed.

In a further preferred form of the invention, (f) the hook hole, which is formed in the base end portion of the operation pedal and through which the one end portion of the return spring adjacent to the operation pedal is hooked, is located between the pivot axis and the pedal pad of the operation pedal in a longitudinal direction of a vehicle. The return spring wound into a coil shape is thus disposed in a tilted manner so that the entire return spring is twisted, and the operation pedal is subjected to the moment in such a direction that the stepping surface of the pedal pad faces toward the first side plate. Accordingly, backlash in the lateral direction of the operation pedal is suitably suppressed.

MODES FOR CARRYING OUT THE INVENTION

An embodiment of the present invention will be described in detail below with reference to the accompanying drawings.

Embodiment

Figure 1:
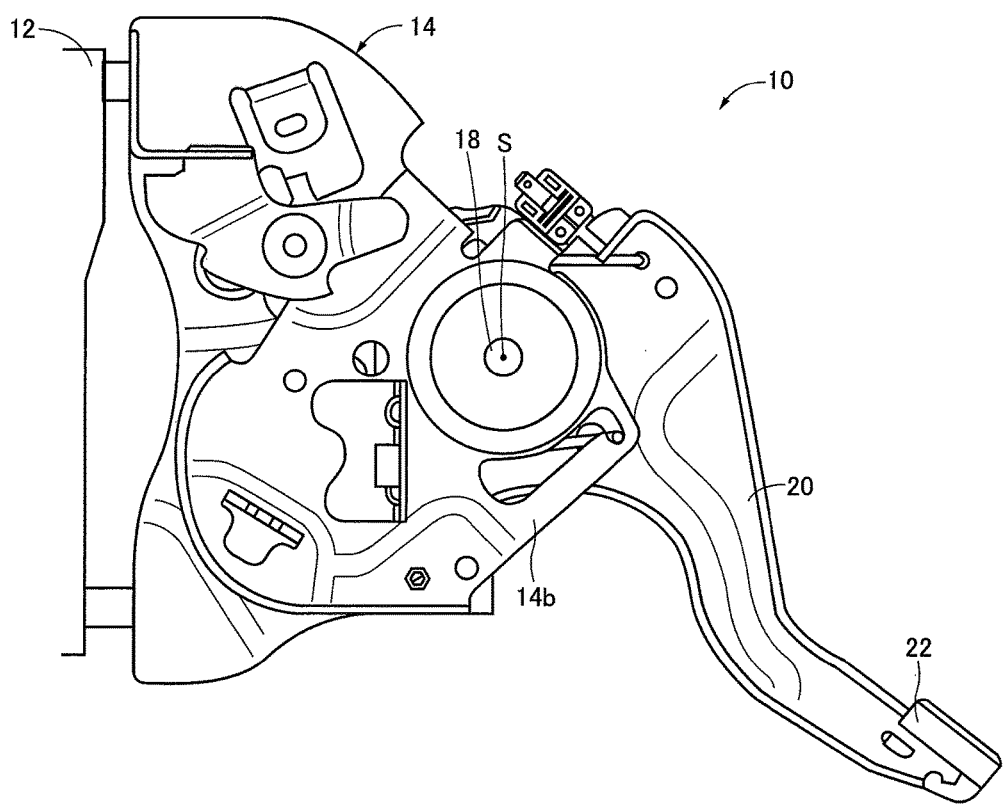
FIG. 1 is a left side view of a foot operated parking brake operation device according to an embodiment of the present invention.
Figure 2:
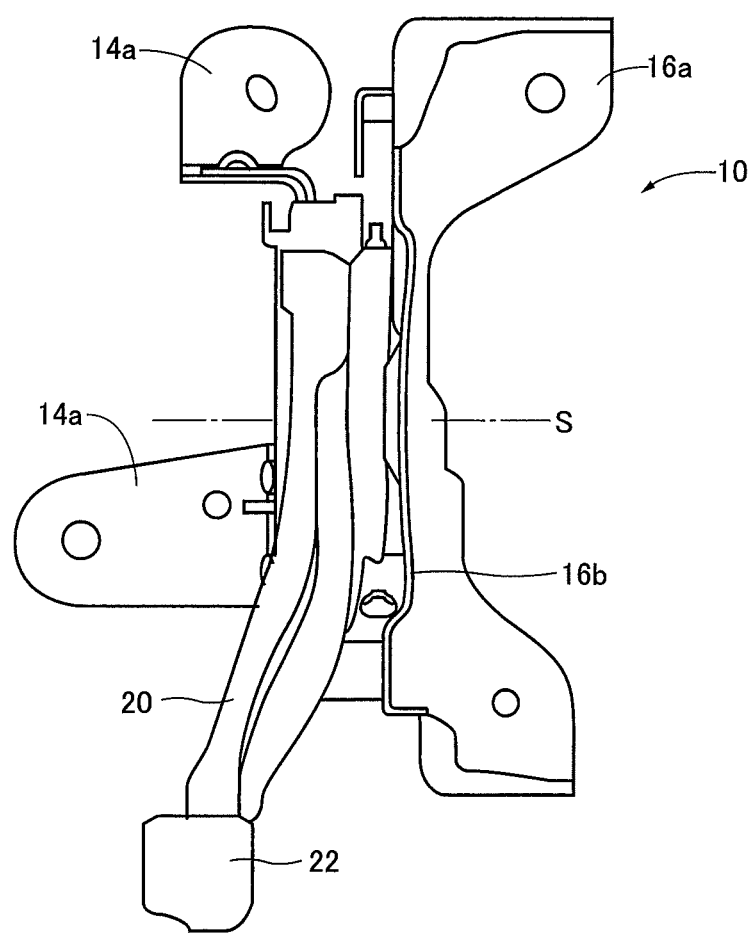
FIG. 2 is a front view of the foot operated parking brake operation device shown in FIG. 1.
Figure 3:
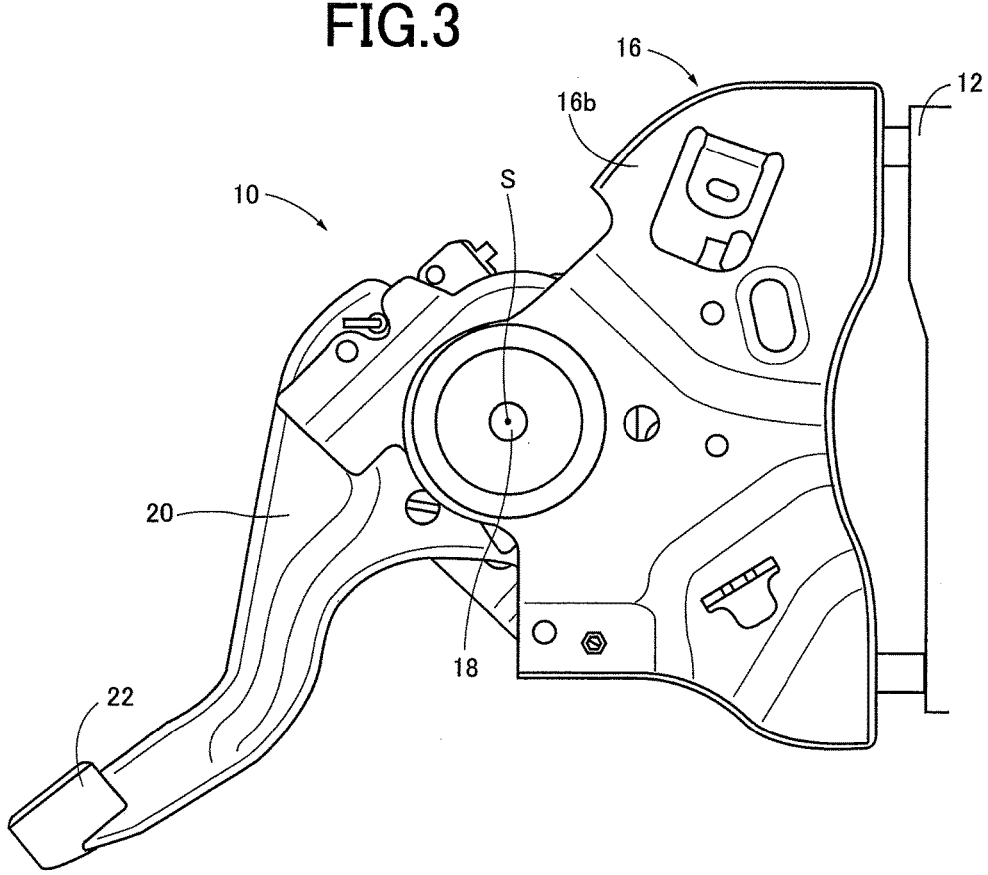
FIG. 3 is a right side view of the foot operated parking brake operation device shown in FIG. 1.
Figure 4:
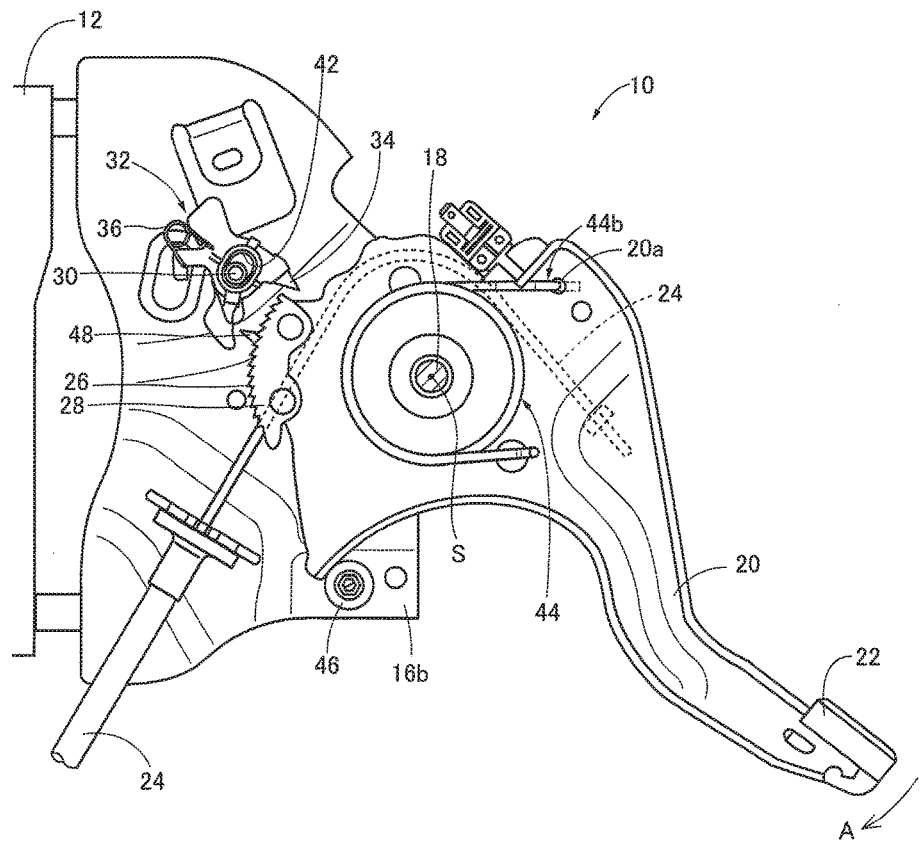
FIG. 4 is a left side view of the foot operated parking brake operation device with a side plate portion of a left bracket removed in order to illustrate the configuration of the foot operated parking brake operation device shown in FIG. 1.

FIGS. 1, 2, and 3 are a left side view, a front view, and a right side view of a foot operated parking brake operation device 10 according to an embodiment of the present invention. FIG. 4 shows the foot operated parking brake operation device 10, as viewed from the side (left side) of a vehicle, with a left bracket 14 removed in order to illustrate the configuration of the foot operated parking brake operation device 10.

The foot operated parking brake operation device 10 includes an operation pedal 20 that is disposed with right and left brackets 16, 14 fixedly attached to a vehicle body 12 at positions forward of the driver's seat of a vehicle so that the operation pedal 20 can pivot about a pivot axis S by a support shaft 18. The left bracket 14 and the right bracket 16 include base plate portions 14*a*, 16*a* fixed to the vehicle body 12, and side plate portions 14*b*, 16*b* bent at right angles from the base plate portions 14*a*, 16*a* and facing each other. The base end portion of the operation pedal 20 is supported by a pair of the side plate portions 14*b*, 16*b* so that the operation pedal 20 can pivot about the support shaft 18. A pedal pad 22 is provided at the distal end portion, namely the lower end portion, of the operation pedal 20. When a driver depresses the pedal pad 22, the operation pedal 20 is caused to pivot about the support shaft 18, so that a parking brake cable 24 is subjected to a tensile force. A parking brake device, not shown, which is provided for a wheel, not shown, is thus operated.

A ratchet 28 having multiple teeth 26 along an arc shape about the pivot axis S is attached to the upper front part of the operation pedal 20. As an engaging tooth 34 of a pawl 32 that is rotatably disposed on the bracket via a pawl pin 30 parallel to the pivot axis S engages with the tooth 26 of the ratchet 28, backward pivoting motion of the operation pedal 20 toward its original position is prevented and the operating state of the parking brake is maintained. The pawl 32 is biased to pivot clockwise about the pawl pin 30 as viewed in the figure by a torsion coil spring 36 hooked on the pawl 32 and the bracket. The engaging tooth 34 thus engages with the tooth 26 of the ratchet 28.

The teeth 26 of the ratchet 28 are inclined teeth having a slope whose height is made larger along the opposite direction to a direction A in which the operation pedal 20 pivots about the pivot axis S when depressed. The pawl 32 biased by the torsion coil spring 36 can thus swing against the biasing force and ride over the teeth 26. When application of the depressing force to the operation pedal 20 is stopped, the operation pedal 20 pivots backward according to the tensile force of the parking brake cable 24, and the triangular engaging tooth 34 enters a tooth space of the ratchet 28 and contacts a locking surface and a bottom land of the tooth 26, preventing any further backward pivoting motion of the operation pedal 20. The operating state of the parking brake is thus maintained. Both the ratchet 28 and the pawl 32 are made of a metal material. The locking surface and a side end face of the engaging tooth 34 which faces the locking surface are linear flat surfaces and substantially closely contact each other, and the bottom land and a tip end face of the engaging tooth 34 are cylindrical surfaces having an arc shape with substantially the same curvature as viewed from the side and substantially closely contact each other. The locked state, or the operating state of the parking brake, is thus stably maintained.

The pawl pin 30 is inserted through a long hole 42 formed in the pawl 32. As the engaging tooth 34 of the pawl 32 engages with the tooth 26 of the ratchet 28, the center of rotation of the pawl 32 changes due to the tensile force of the parking brake cable 24, and the biasing direction of the torsion coil spring 36 is reversed. Accordingly, when the operation pedal 20 is depressed again and the pawl 32 is disengaged from the ratchet 28, the pawl 32 pivots counterclockwise about the pawl pin 30 as viewed in the figure according to the biasing force of the torsion coil spring 36, so that the pawl 32 is not allowed to engage with the ratchet 28. The operation pedal 20 is biased to pivot about the pivot axis S toward its original position by a return spring 44 that has two end portions, namely a pair of end portions 44a, 44b, one of which is hooked on the base end portion of the operation pedal 20 and the other of which is hooked on the side plate portion 14b of the left bracket 14 and has its portion between the end portions 44a, 44b, namely a winding portion 44c, wound about the support shaft 18 or the pivot axis S. The operation pedal 20 pivots backward to the original position shown in FIGS. 1 to 4 according to the biasing force of the return spring 44 and the tensile force of the parking brake cable 24. The original position of the operation pedal 20 is determined by a stopper 46 attached to the side plate portion of the bracket. When the operation pedal 20 pivots backward to the original position, a return contact portion 48 formed integrally with the operation pedal 20 contacts the pawl 32, whereby the pawl 32 pivots about the pawl pin 30, the center of rotation of the pawl 32 is restored to its initial position, and the biasing direction of the torsion coil spring 36 returns to the clockwise direction as viewed in the figure.

Figure 5:
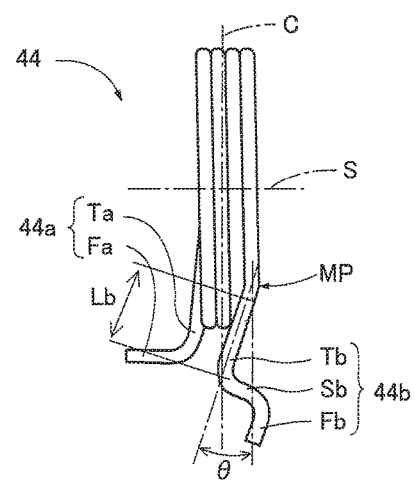
FIG. 5 is a plan view showing the structure of a return spring included in the foot operated parking brake operation device shown in FIG. 1.
Figure 6:
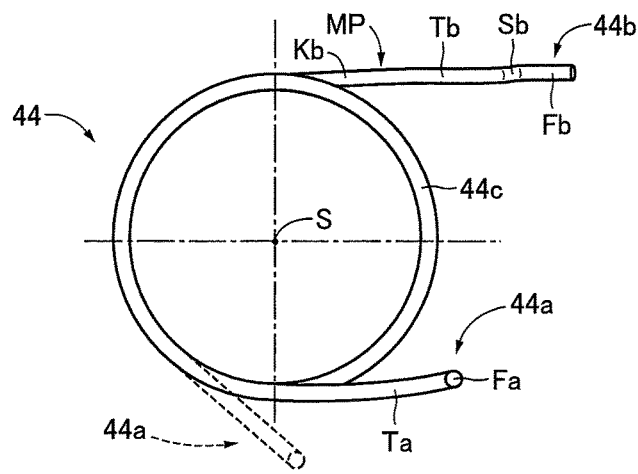
FIG. 6 is a left side view showing the structure of the return spring included in the foot operated parking brake operation device shown in FIG. 1.
Figure 7:
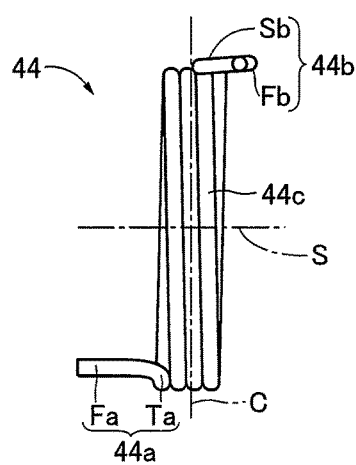
FIG. 7 is a front view showing the structure of the return spring included in the foot operated parking brake operation device shown in FIG. 1.

FIGS. 5, 6, and 7 are a plan view, a left side view, and a front view showing the shape of the return spring 44 after the return spring 44 is attached. Before the return spring 44 is attached, the end portion 44a is located at a position shown by a dashed line in FIG. 6. The return spring 44 includes the end portions 44a, 44b, one of which is hooked on the base end portion of the operation pedal 20 and the other of which is hooked on the side plate portion 14b of the left bracket 14, and the winding portion 44c between the end portions 44a, 44b which is wound about the pivot axis S or the support shaft 18. The winding portion 44c has the same axis as the pivot axis. The operation pedal 20 is a pressed part produced by bending a single steel sheet into a longitudinal shape having a U-shape in section perpendicular to its longitudinal direction. The operation pedal 20 is positioned in the pivot axis S direction so that a center plane C of the thickness dimension in the pivot axis S direction of the operation pedal 20, which is a plane perpendicular to the pivot axis S of the base end portion of the operation pedal 20, passes through the winding portion 44c of the return spring 44.

Figure 8:
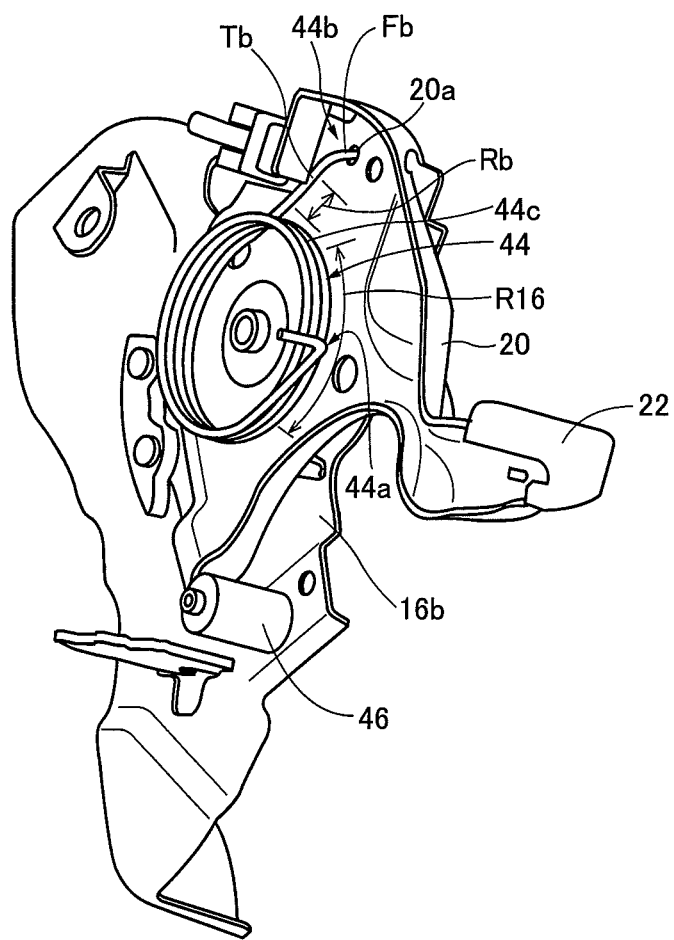
FIG. 8 is a perspective view of the foot operated parking brake operation device with the side plate portion of the left bracket removed, illustrating how the return spring included in the foot operated parking brake operation device shown in FIG. 1 is attached.
Figure 9:
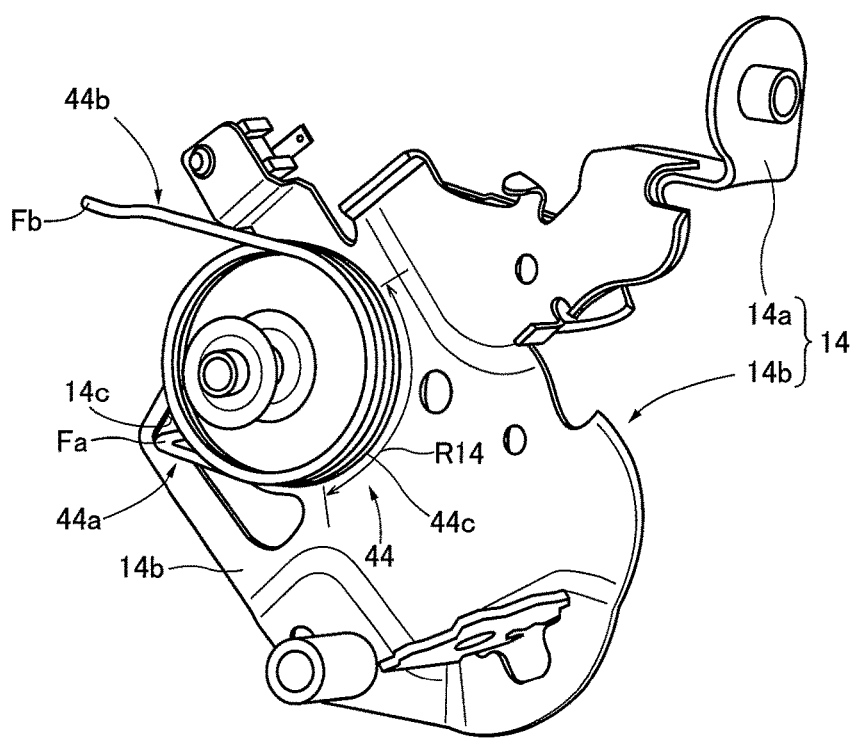
FIG. 9 is a perspective view of the foot operated parking brake operation device with a side plate portion of a right bracket and an operation pedal removed, illustrating how the return spring included in the foot operated parking brake operation device shown in FIG. 1 is attached.
Figure 10:
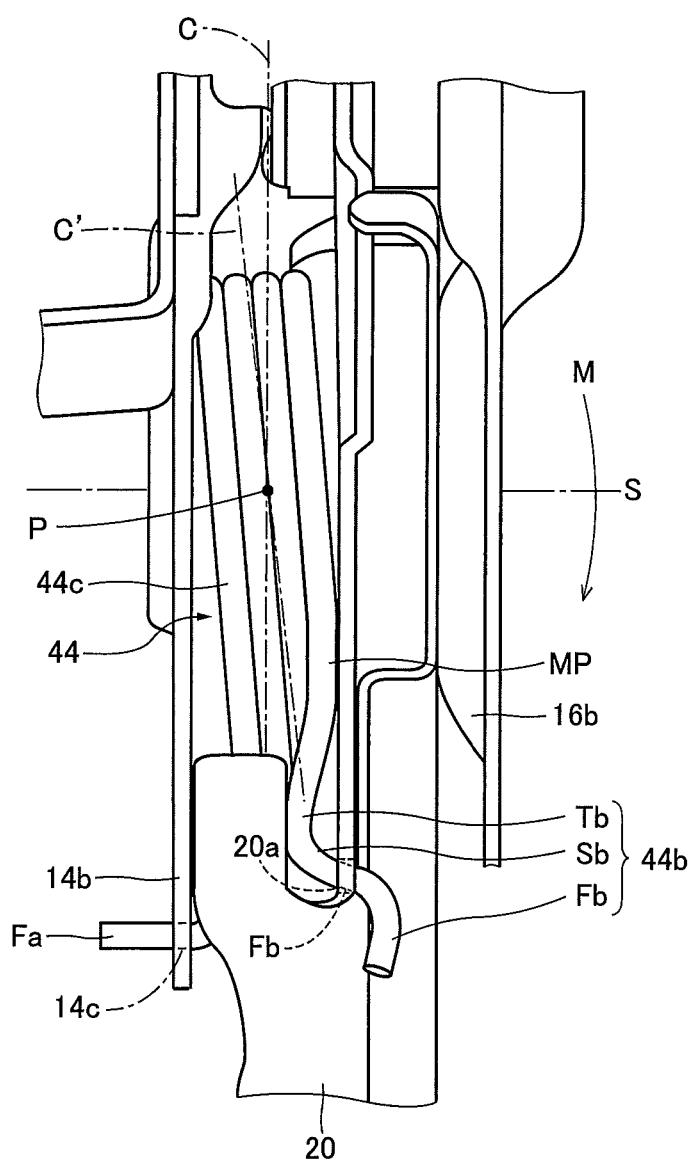
FIG. 10 is an enlarged view of the foot operated parking brake operation device, illustrating the return spring attached to the foot operated parking brake operation device shown in FIG. 1 in a state where a winding portion of the return spring is tilted with respect to the axis of a support shaft.

FIGS. 8, 9, and 10 are a perspective view with the left bracket 14 removed, a perspective view with the right bracket 16 removed, and an enlarged front view, illustrating how the return spring 44 is attached. The end portion 44a of the return spring 44 which is hooked on the side plate portion 14b of the left bracket 14 includes a linear portion Ta extending from the winding portion 44c in a direction tangential to the winding portion 44c, and a hook portion Fa bent at right angles to the linear portion Ta so as to be parallel to the pivot axis S. The hook portion Fa is hooked through a hook hole 14c as a through hole extending through the side plate portion 14b of the left bracket 14.

The end portion 44b of the return spring 44 which is hooked on the base end portion of the operation pedal 20 includes a linear portion Kb extending in a direction tangential to the winding portion 44c, a linear bent portion Tb having a length Lb and bent at a bend point MP at a predetermined bend angle θ with respect to the center plane C of the operation pedal 20 from the winding portion 44c toward the left bracket 14, namely toward the center plane C of the operation pedal 20, an offset portion Sb bent at right angles to the bent portion Tb, and a hook portion Fb bent at right angles to the offset portion Sb. The hook portion Fb is hooked through a hook hole 20a as a through hole extending through the right bracket 16 side of the base end portion of the operation pedal 20 in the pivot axis S direction. The bent portion Tb, the hook portion Fb, and the hook hole 20a through which the hook portion Fb is hooked are located between the axis S of the support shaft 18 and the pedal pad 22 in the longitudinal direction of the vehicle which is the lateral (horizontal) direction in FIG. 4, so that the elastic restoring force of the bent portion Tb is applied in a direction toward the left bracket 14 to a region between the axis S and the pedal pad 22. The length Lb of the bent portion Tb is set to about 25 mm in view of the balance between suppression of lateral backlash and ease of assembly. Setting the length Lb to a value smaller than about 25 mm tends to affect the ease of assembly, and setting length Lb to a value larger than about 25 mm tends to affect the suppression of lateral backlash.

As described above, the bent portion Tb of the end portion 44b of the return spring 44 is bent at the bend point MP at the predetermined bend angle θ with respect to the center plane C of the operation pedal 20 from the winding portion 44c toward the left bracket 14, namely toward the center plane C of the operation pedal 20, so as to extend in a direction tangential to the winding portion 44c. Accordingly, when the hook portion Fb of the end portion 44b is deformed in such a direction that the hook portion Fb becomes parallel to the center plane C of the operation pedal 20, and is engaged with the hook hole 20a as a through hole extending through the base end portion of the operation pedal 20 as shown in FIG. 10, clockwise moment M is generated about the intersection P of the pivot axis S and the center plane C in the front view of FIG. 10 by the elastic restoring force of the bent portion Tb as shown in FIG. 10. Due to this moment M, a center plane C' of the winding portion 44c is tilted with respect to the center plane C, namely the center plane before attachment of the return spring 44, so that the entire return spring is twisted, and a stepping surface of the pedal pad 22 of the operation pedal 20, namely a surface to be stepped on, is tilted in such a direction that the stepping surface of the pedal pad faces toward the left bracket 14, namely toward the left side of the vehicle. Accordingly, in a winding portion contact region R16 in FIG. 8, the winding portion 44c of the return spring 44 and the side plate portion 16b of the right bracket 16 contact each other in a pressurized state. In a bend point contact region Rb in FIG. 8, the bend point MP of the end portion 44b of the return spring 44 adjacent to the right bracket 16 and the side plate portion 16b of the right bracket 16 contact each other in a pressurized state. In a winding portion contact region R14 in FIG. 9, the winding portion 44c of the return spring 44 and the side plate portion 14b of the left bracket 14 contact each other in a pressurized state. Such pressurization suitably eliminates backlash in the lateral direction, namely lateral backlash, of the pedal pad 22 of the operation pedal 20.

Figure 11:
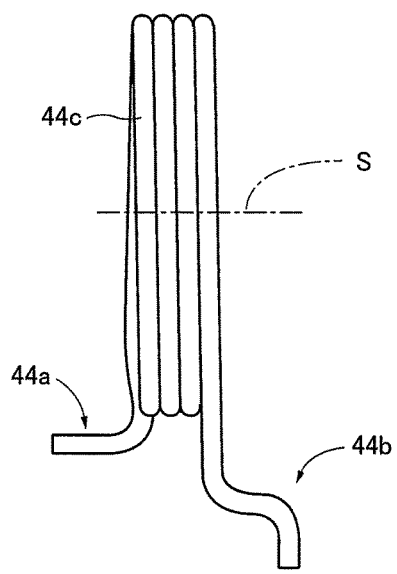
FIG. 11 is a plan view showing an end portion of a return spring adjacent to an operation pedal included in a foot operated parking brake operation device in a reference example, and corresponds to FIG. 5.
Figure 12:
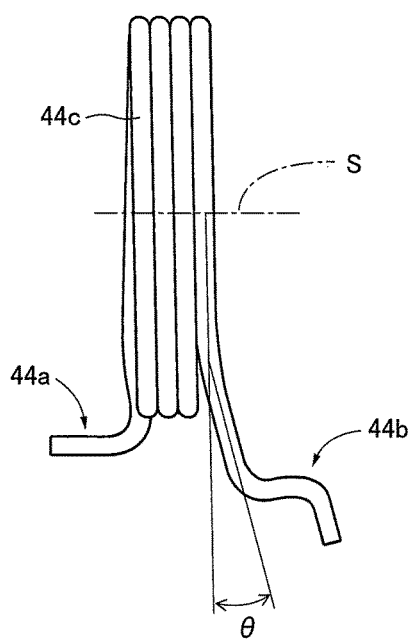
FIG. 12 is a plan view showing a bend angle of a bend portion of an end portion of a return spring adjacent to an operation pedal included in a foot operated parking brake operation device in a reference example, and corresponds to FIG. 5.

The inventors produced test piece 1 of the return spring shown in FIG. 11, and test piece 2 and test piece 3 of the return spring shown in FIG. 12 by winding a piano wire (JIS G 3522) with a diameter of φ3.8 mm so that the winding portion 44c had a winding diameter (inside diameter of the coil) of φ66.2 mm. The test piece 1 is similar to the return spring 44 except that the test piece 1 is not bent at the bend point MP and the linear portion Kb and the bent portion Tb are present on a straight line. The test piece 2 and the test piece 3 are similar to the return spring 44 except that the bent portion Tb is bent toward the right bracket 16, namely in the opposite direction to that in the above embodiment, and the bend angle θ of the bent portion Tb with respect to the center plane C is 15° and 25°. These test pieces 1, 2, and 3 were used to measure backlash in the lateral direction (lateral backlash) of the pedal pad 22 under the following test conditions.

(Lateral Backlash Test Conditions)

Measuring devices: load cell, displacement gauge, digital indicator, and digital oscillo-recorder Measuring method: (1) A test piece is attached to a rigid jig (the parking brake cable is removed beforehand)

(2) In the above measuring devices, displacement under no load is set to zero, and lateral backlash (mm) is measured by applying a load of ±4.9 N to the pedal pad in the lateral direction of the vehicle and obtaining the total amount of change based on a force-strain (F-S) diagram obtained.

According to this lateral backlash test, the test piece 1 had lateral backlash of 6.8 mm, and the test pieces 2, 3 had lateral backlash of 6.4 mm and 6.7 mm. These lateral backlash values are higher than a preset quality standard value of 3 mm. The test pieces 1 to 3 therefore fail to meet the requirements.

Figure 13:
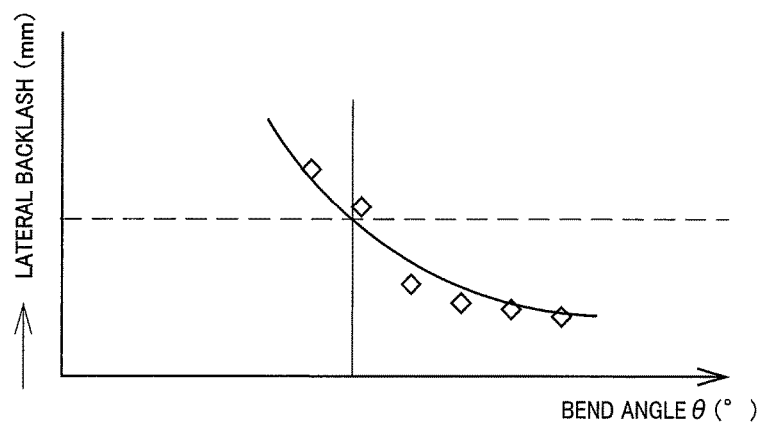
FIG. 13 is a graph showing the result of experiments measuring lateral backlash values of six kinds of return springs having a different bend angle $\theta$, and the graph illustrating the relationship between the bend angle of a bend portion adjacent to the operating pedal of the return spring and lateral backlash of a pedal pad of the operation pedal.

The inventors then produced six kinds of test pieces 4 to 9 by using wires of the same material and the same diameter and using the same winding diameter as in the test pieces 1 to 3. These test pieces 4 to 9 have a configuration similar to that of the return spring 44 shown in FIGS. 5 to 7 etc. of the above embodiment, but their bend angles θ at the bend point MP are 20°, 21°, 22°, 23°, 24°, and 25°. The inventors conducted a lateral backlash test similar to that described above by using the six kinds of test pieces 4 to 9. FIG. 13 shows the result of experiments carried out by the inventors. As can be seen from this result, a preferred result was obtained when the bend angle θ (of the bent portion Tb with respect to the center plane C of the operation pedal 20) at the bend point MP was larger than 21°, as lateral backlash was equal to or smaller than the preset quality standard value of 3 mm.

As described above, in the foot operated parking brake operation device 10 of the embodiment, the return spring 44 is wound about the pivot axis S into a coil shape, and the end portion 44b of the return spring 44 adjacent to the operation pedal 20 is bent and formed so as to bias the operation pedal 20 toward the side plate portion 14b (first side plate) of the left bracket 14 when attached. The return spring 44 wound into a coil shape is therefore disposed in a tilted manner so that the entire return spring 44 is twisted as shown in FIG. 10, and the operation pedal 20 is subjected to the moment M in such a direction that the stepping surface of the pedal pad 22 faces toward the side plate portion 14b of the left bracket 14. Accordingly, backlash in the lateral direction of the operation pedal 20 is suitably suppressed by the moment M with such a simple configuration that the end portion of the return spring 44 adjacent to the operation pedal 20 is bent and formed so as to bias the operation pedal 20 toward the side plate portion 14b of the left bracket 14.

According to the foot operated parking brake operation device 10 of the embodiment, the end portion 44b of the return spring 44 adjacent to the operation pedal 20 projects in the direction tangential to the winding portion 44c and is bent at the predetermined bend angle θ toward the side plate portion 14b (first side plate) of the left bracket 14. The return spring 44 wound into a coil shape is therefore disposed in a tilted manner so that the entire return spring 44 is twisted, and the operation pedal 20 is subjected to the moment M in such a direction that the stepping surface of the pedal pad 22 faces toward the side plate portion 14b of the left bracket 14. Accordingly, backlash in the lateral direction of the operation pedal 20 is suitably suppressed.

According to the foot operated parking brake operation device 10 of the embodiment, the base end portion of the operation pedal 20 has such a thickness dimension in the pivot axis S direction that the base end portion of the operation pedal 20 overlaps the winding portion 44c in the radial direction of the winding portion 44c. The base end portion of the operation pedal 20 has the hook hole 20a through which the end portion 44b of the return spring 44 adjacent to the operation pedal 20 is hooked, the hook hole 20a is located closer to the side plate portion 16b (second side plate) of the right bracket 16 than the center plane C located in the middle in the thickness direction of the base end portion is, and the end portion 44b of the return spring 44 adjacent to the operation pedal 20 is formed so as to be bent toward the center plane C of the operation pedal 20. The return spring 44 wound into a coil shape is therefore disposed in a tilted manner so that the entire return spring 44 is twisted, and the operation pedal 20 is subjected to the moment M in such a direction that the stepping surface of the pedal pad 22 faces toward the side plate portion 14b of the left bracket 14. Accordingly, backlash in the lateral direction of the operation pedal 20 is suitably suppressed.

According to the foot operated parking brake operation device 10 of the embodiment, the hook hole 20a, which is formed in the base end portion of the operation pedal 20 and through which the end portion 44b of the return spring 44 adjacent to the operation pedal 20 is hooked, is located between the pivot axis S and the pedal pad 22 of the operation pedal 20 in the longitudinal direction of the vehicle which is the lateral (horizontal) direction in FIG. 4. The return spring 44 wound into a coil shape is thus disposed in a tilted manner so that the entire return spring 44 is twisted, and the operation pedal 20 is subjected to the moment M in such a direction that the stepping surface of the pedal pad 22 faces toward the side plate portion 14b (first side plate) of the left bracket 14. Accordingly, backlash in the lateral direction of the operation pedal 20 is suitably suppressed.

Although the embodiment of the present invention is described above based on the drawings, the present invention is also applied in other forms.

For example, the pair of right and left brackets 16, 14 is used as separate parts in the above embodiment. However, the left bracket 14 and the right bracket 16 may be a single-piece member. In other words, any bracket including the left side plate portion 14b and the right side plate portion 16b can be used in the present invention.

The return spring 44 of the above embodiment generates the moment M as the end portion 44b of the return spring 44 biases the region between the pivot axis S and the pedal pad 22 of the operation pedal 20 in the longitudinal direction of the vehicle toward the left bracket 14. However, the return spring 44 may have any other shape as long as it generates the moment M. For example, the end portion 44a of the return spring 44 adjacent to the left bracket 14 may project in the opposite direction to that of the end portion 44b of the return spring 44 adjacent to the right bracket 16 with respect to the pivot axis S and may be bent and formed to have a bent portion similar to the bent portion Tb of the end portion 44b in the above embodiment so as to cause the winding portion 44c to generate a biasing force in the direction toward the left bracket 14. In this case, the return spring 44 is attached so as to be twisted in the opposite direction to that shown in FIG. 10, and moment in the opposite direction to that of the moment M is generated, so that the pedal pad 22 of the operation pedal 20 is biased toward the right bracket 16. Accordingly, lateral backlash in the pedal pad 22 of the operation pedal 20 is suitably suppressed in this case as well.

Although the embodiment of the present invention is described above in detail based on the drawings, the embodiment is shown by way of example only, and the present invention can be embodied in various modified or improved forms based on the knowledge of those skilled in the art.

The invention claimed is:

1. An operation device for a vehicle parking brake, comprising:
    a support bracket fixed to a vehicle body and having a pair of first and second side plates, the first and second side plates facing each other with a predetermined interval therebetween;
    an operation pedal disposed between the first and second side plates of the support bracket, the operation pedal being supported by the support bracket so as to pivot about a pivot axis;
    a return spring having:
        one end portion hooked on the operation pedal;
        another end portion hooked on the first side plate; and
        a winding portion located between the end portions of the return spring and being wound about the pivot axis, the winding portion biasing the operation pedal towards an original position of the operation pedal, and in which the operation pedal is operated to pivot about the pivot axis, so that a parking brake cable is subjected to a tensile force, thereby operating the parking brake, wherein
    one of the end portions of the return spring is bent and formed so as to bias a pedal pad of the operation pedal toward the first side plate or the second side plate, and
    the another end portion of the return spring adjacent to the operation pedal projects from the winding portion in a direction tangential thereto and is bent at a predetermined angle toward the first side plate.

2. The operation device for the vehicle parking brake according to claim 1, wherein
    a base end portion of the operation pedal has such a thickness dimension in a direction of the pivot axis that the base end portion of the operation pedal overlaps the winding portion in a radial direction of the winding portion, and has a hook hole through which the one end portion of the return spring adjacent to the operation pedal is hooked, the hook hole being located closer to the second side plate than a center plane that is located in a middle of the operation pedal in a thickness direction of the base end portion, and
    the one end portion of the return spring adjacent to the operation pedal is formed so as to be bent toward the center plane side of the operation pedal.

3. The operation device for the vehicle parking brake according to claim 2, wherein
    the hook hole is formed in the base end portion of the operation pedal and through which the one end portion of the return spring adjacent to the operation pedal is hooked, and located between the pivot axis and the pedal pad of the operation pedal in a longitudinal direction of a vehicle.

4. The operation device for the vehicle parking brake according to claim 1, wherein
    the one end portion of the return spring is hooked on the operating pedal while being elastically deformed, and
    the pedal pad of the operation pedal is biased in a direction toward the first side plate away from the second side plate, by a restoring force generated by elastic deformation of the one end portion of the return spring.

5. The operation device for the vehicle parking brake according to claim 4, wherein the return spring includes a contact portion that is in contact with the first side plate, the contact portion being distant from the one end portion of the return spring in a circumferential direction of the winding portion of the return spring.

6. The operation device for the vehicle parking brake according to claim 1, wherein the winding portion of the return spring includes a contact portion that is in contact with the first side plate, the contact portion being distant from the one end portion of the return spring in a circumferential direction of the winding portion of the return spring.

7. An operation device for a vehicle parking brake, comprising:
    a support bracket fixed to a vehicle body and having a pair of first and second side plates, the first and second side plates facing each other with a predetermined interval therebetween;

an operation pedal disposed between the first and second side plates of the support bracket, the operation pedal supported by the support bracket so as to pivot about a pivot axis;

a return spring having:
one end portion hooked on the operation pedal;
another end portion hooked on the first side plate; and
a winding portion located between the ends portions of the return spring and being wound about the pivot axis, the winding portion biasing the operation pedal towards an original position of the operation pedal, and in which the operation pedal is operated to pivot about the pivot axis, so that a parking brake cable is subjected to a tensile forces thereby operating the parking brake, wherein one of the end portions of the return spring is bent and formed so as to bias a pedal pad of the operation pedal toward the first side plate or the second side plate, a base end portion of the operation pedal has such a thickness dimension in a direction of the pivot axis that the base end portion of the operation pedal overlaps the winding portion in a radial direction of the winding portion, and has a hook hole through which the one end portion of the return spring adjacent to the operation pedal is hooked, the hook hole being located closer to the second side plate than a center plane that is located in a middle of the operation pedal in a thickness direction of the base end portion, and the one end portion of the return spring adjacent to the operation pedal is formed so as to be bent toward the center plane of the operation pedal.

8. The operation device for the vehicle parking brake according to claim 7, wherein
the hook hole is formed in the base end portion of the operation pedal and through which the one end portion of the return spring adjacent to the operation pedal is hooked, and located between the pivot axis and the pedal pad of the operation pedal in a longitudinal direction of a vehicle.

9. The operation device for the vehicle parking brake according to claim 7, wherein
the one end portion of the return spring is hooked on the operating pedal while being elastically deformed, and
the pedal pad of the operation pedal is biased in a direction toward the first side plate away from the second side plate, by a restoring force generated by elastic deformation of the one end portion of the return spring.

10. The operation device for the vehicle parking brake according to claim 9, wherein the return spring includes a contact portion that is in contact with the first side plate, the contact portion being distant from the one end portion of the return spring in a circumferential direction of the winding portion of the return spring.

11. The operation device for the vehicle parking brake according to claim 7, wherein the winding portion of the return spring includes a contact portion that is in contact with the first side plate, the contact portion being distant from the one end portion of the return spring in a circumferential direction of the winding portion of the return spring.

* * * * *